United States Patent [19]

Brinkley et al.

[11] Patent Number: 5,708,726
[45] Date of Patent: Jan. 13, 1998

[54] TAUT ARMATURE RESONANT IMPULSE TRANSDUCER

[75] Inventors: Gerald Eugene Brinkley, West Palm Beach; John Michael McKee, Hillsboro Beach; Charles Wright Mooney, Lake Worth; Irving Harold Holden, Boca Raton, all of Fla.

[73] Assignee: Motorola, Inc., Schaumburg, Ill.

[21] Appl. No.: 515,658

[22] Filed: Aug. 16, 1995

[51] Int. Cl.$^6$ .................................................. H04R 25/00
[52] U.S. Cl. .................. 381/200; 381/192; 381/193; 381/203; 340/825.46; 340/311.1
[58] Field of Search ........................... 381/192, 202, 381/151, 200, 193, 203; 340/825.46, 311.1, 407.1, 407

[56] References Cited

U.S. PATENT DOCUMENTS

| 5,023,504 | 6/1991 | Mooney et al. | 310/322 |
| 5,107,540 | 4/1992 | Mooney et al. | 381/192 |
| 5,172,092 | 12/1992 | Nguyen et al. | 340/311.1 |
| 5,327,120 | 7/1994 | McKee et al. | 340/825.46 |
| 5,524,061 | 6/1996 | Mooney et al. | 381/151 |

*Primary Examiner*—Sinh Tran
*Attorney, Agent, or Firm*—Philip P. Macnak

[57] ABSTRACT

A taut armature resonant impulse transducer (100) includes an armature (12), an electromagnetic driver (24, 26) and a magnetic motional mass (18). The armature includes upper (14, 15) and lower (16, 17) cross-coupled non-linear resonant suspension members, each including first and second non-linear springs (62, 72) connected to a stepped central region and to opposite contiguous planar perimeter regions of an electromagnetic driver (24, 26) which effects an alternating electromagnetic field. A first end of the second non-linear spring is positioned within a periphery defining a shape of the first non-linear spring. The magnetic motional mass (18) is suspended between the upper (14, 15) and lower (16, 17) cross-coupled non-linear resonant suspension members, and provides an alternating movement in response to the alternating electromagnetic field which is transformed through the upper (14, 15) and lower (16, 17) cross-coupled non-linear resonant suspension members and the electromagnetic driver (24, 26) into motional energy.

18 Claims, 4 Drawing Sheets

TAUT ARMATURE RESONANT IMPULSE TRANSDUCER

BACKGROUND OF THE INVENTION

1. Field of the Invention

This invention relates in general to electromagnetic transducers, and more specifically to a taut armature resonant electromagnetic transducer.

2. Description of the Prior Art

Portable communication devices, such as pagers, have generally used cylindrical motors which spin an eccentric counterweight or "pancake" motors which utilize eccentric armature weighting to generate a tactile, or vibratory alert. Such an alert is desirable to generate a "silent" alert which is used to alert the user that a message has been received without disrupting persons located nearby. While such devices have worked satisfactorily for many years and are still widely being used, several issues limit a much broader use. Motors, when used to provide a tactile, "silent", alert are hardly "silent", but rather provide a perceptible acoustic output due in part to the high rotational frequency required for the operation d the motor to spin the counterweight sufficiently to provide a perceptible tactile stimulation. Likewise, such motors, as a result of their inherent design, have generally consumed a substantial amount of energy for operation. This has meant that the motor must be switched directly from the battery for operation, and significantly impacts the battery life that can be expected during normal operation of the portable communication devices.

Recently, a new generation of non-rotational, radial electromagnetic transducers was described by Mooney et al., U.S. Pat. No. 5,107,540, and McKee et al., U.S. Pat. No. 5,327,120, which significantly reduced the energy consumed from a battery for operation as a tactile alerting device. In addition, since the electromagnetic transducer operated at a sub-audible frequency which maximized the tactile sensation developed when the transducer is coupled to a person, a truly silent non-disruptive alert was provided. Because the size and shape of the radial electromagnetic transducer was similar to that of a pancake motor, retrofits of the new device could readily be more accommodated in established communication devices with little change to the driving circuitry or mechanics.

While the new generation of non-rotational, radial electromagnetic transducers have significantly reduced the energy consumption, and have also significantly reduced the sound developed when in actual operation, there is yet a need for an electromagnetic transducer which provides an even lower energy consumption, while maintaining the performance characteristics of the radial electromagnetic transducers. There is further a need to provide an electromagnetic transducer which minimizes the size of the transducer for a given tactile energy output.

SUMMARY OF THE INVENTION

A taut armature resonant impulse transducer includes an electromagnetic driver for effecting an alternating electromagnetic field in response to an input signal;, a magnetic motional mass and an armature. The magnetic motional mass has a stepped central region which includes a first termination at a first level and a second termination at a second level, the second level being lower than said first level. The armature includes upper cross-coupled non-linear suspension members and lower cross-coupled non-linear suspension members. The cross-coupled non-linear suspension members include first and second non-linear springs, each having a first end and a second end utilized for terminating the first and second non-linear springs. The first end of the first non-linear spring connects to the first termination of the magnetic motional mass, and the first end of the second non-linear spring is positioned within a periphery defining a shape of the first non-linear spring and connects to the second termination of the magnetic motional mass. The second end of the first and second non-linear springs connect to opposite perimeter regions of the electromagnetic driver. The magnetic motional mass is suspended between the upper cross-coupled non-linear suspension members and the lower cross-coupled non-linear suspension members, and is coupled to the alternating electromagnetic field for generating an alternating movement of the magnetic motional mass in response thereto. The alternating movement of the magnetic motional mass is transformed through the upper cross-coupled non-linear suspension members and the lower cross-coupled non-linear suspension members and the electromagnetic driver into motional energy.

An inertial audio delivery device, includes a taut armature resonant transducer and a housing for enclosing the taut armature resonant impulse transducer. The taut armature resonant impulse transducer includes an electromagnetic driver for effecting an alternating electromagnetic field in response to an input signal;, a magnetic motional mass and an armature. The magnetic motional mass has a stepped central region which includes a first termination at a first level and a second termination at a second level, the second level being lower than said first level. The armature includes upper cross-coupled non-linear suspension members and lower cross-coupled non-linear suspension members. The cross-coupled non-linear suspension members include first and second non-linear springs, each having a first end and a second end utilized for terminating the first and second non-linear springs. The first end of the first non-linear spring connects to the first termination of the magnetic motional mass, and the first end of the second non-linear spring is positioned within a periphery defining a shape of the first non-linear spring and connects to the second termination of the magnetic motional mass. The second end of the first and second non-linear springs connect to opposite perimeter regions of the electromagnetic driver. The magnetic motional mass is suspended between the upper cross-coupled non-linear suspension members and the lower cross-coupled non-linear suspension members, and is coupled to the alternating electromagnetic field for generating an alternating movement of the magnetic motional mass in response thereto. The alternating movement of the magnetic motional mass is transformed through the upper cross-coupled non-linear suspension members and the lower cross-coupled non-linear suspension members and the electromagnetic driver info motional energy. The housing delivers the motional energy.

DESCRIPTION OF THE PREFERRED EMBODIMENTS

Figure 1:
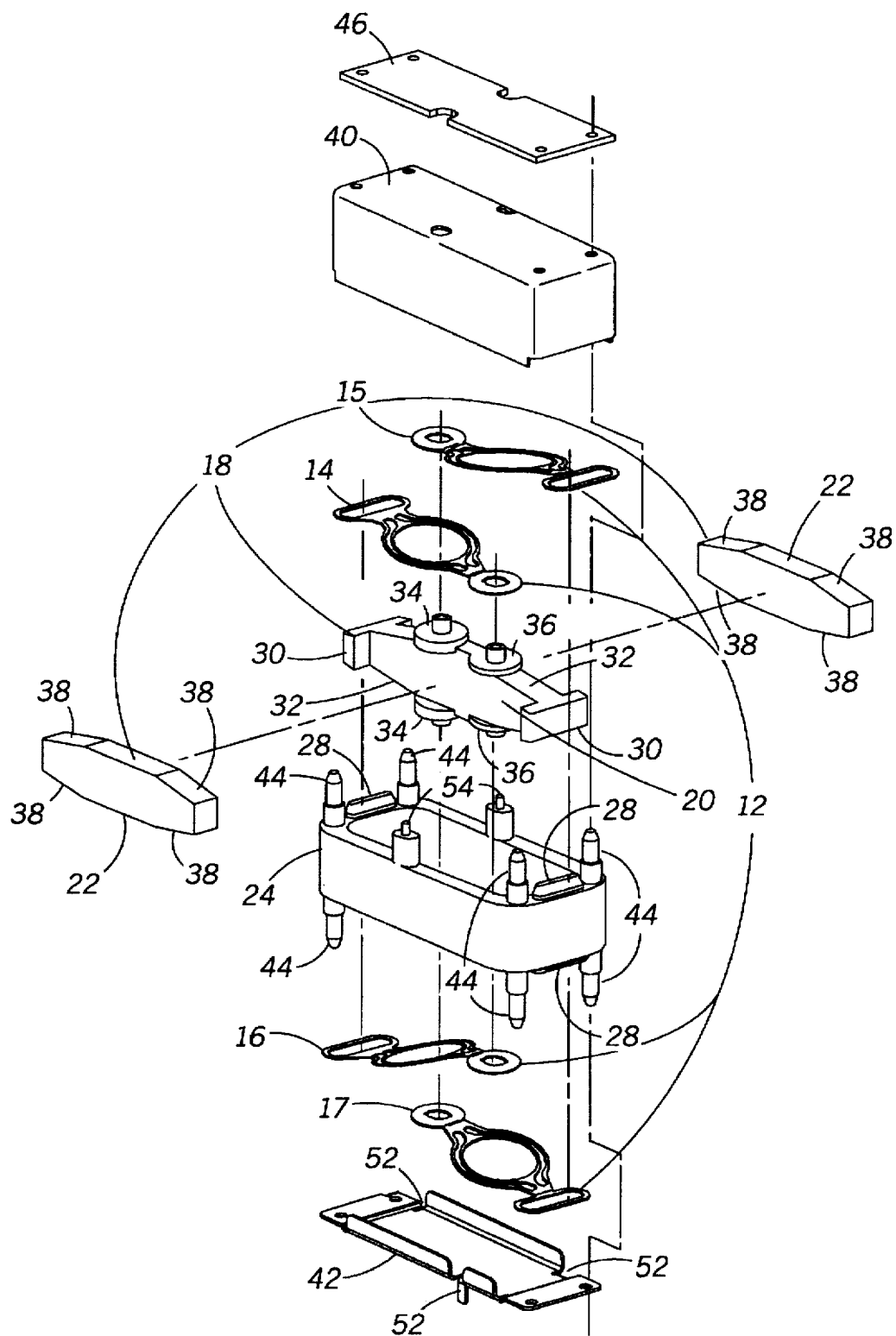
FIG. 1 is an exploded view of a taut armature resonant impulse transducer in accordance with the preferred embodiment of the present invention.

FIG. 1 is an exploded view of a taut armature resonant impulse transducer 100 in accordance with the preferred embodiment of the present invention. The taut armature resonant impulse transducer 100 comprises an armature 12 including upper 14 and 15 and lower 16, 17 cross-coupled non-linear suspension members, a support frame 24 including an electromagnetic coil 26 (shown in FIG. 6) and represented by coil termination 54, and a magnetic motional mass 18 including a magnet support 20 and two permanent magnets 22. The support frame 24 and the electromagnetic coil 26 are referred to collectively as an electromagnetic driver which effects an alternating electromagnetic field as will be described further below. By way of example, the electromagnetic coil 26 comprises enamel coated copper wire which terminates in coil termination 54, and which presents a resistance of approximately one hundred (100) ohms. The electromagnetic driver (24, 26) is preferably manufactured using an injection molding process wherein the coil 26 is molded into the support frame 24. By way of example, a 30% glass-filled liquid crystal polymer,is used to form the support frame 24, although it will be appreciated that other injection moldable thermoplastic materials can be utilized as well. The upper cross-coupled non-linear resonant suspension members 14, 15 and the lower cross-coupled non-linear resonant suspension 16, 17 are attached, as will be described below, to the support frame 24 by four bosses 28, of which only three are visible in FIG. 1.

Figure 2:
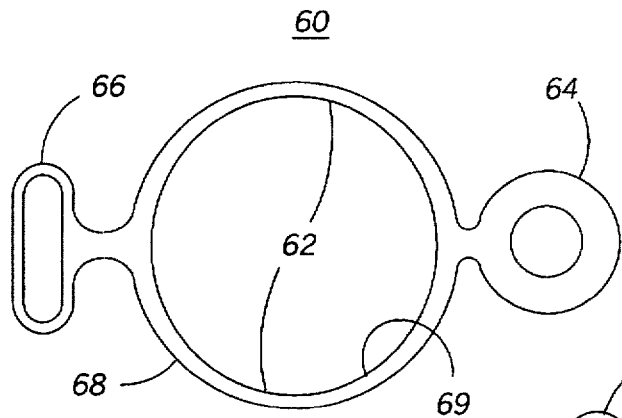
FIGS. 2 and 3 are top elevational views of planar non-linear springs utilized for the cross-coupled non-linear resonant suspension members in the taut armature resonant impulse transducer of FIG. 1.
Figure 3:
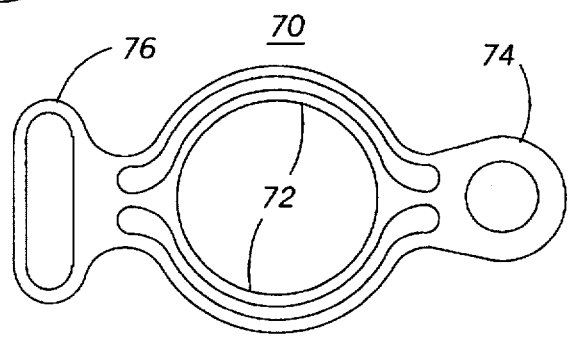

The upper non-linear resonant suspension members 14, 15 and the lower non-linear resonant suspension members 16, 17 are formed by planar non-linear springs shown by way of example in FIG. 2 as a planar non-linear spring 60 formed by two curved planar beams 62 and in FIG. 3 as a compound planar non-linear spring 70 formed from two curved juxtaposed planar compound beams 72. FIG. 2 is a top elevational view of a planar non-linear spring 60 which includes two curved planar beams 62 terminating in first and second ends, the first end terminating in a mounting tab 64 for connection to the stepped central region of the magnet support 20 and the second end terminating in a mounting tab 66 for symmetrical connection to opposite planar perimeter regions of the support frame 24. The two curved planar beams 62 have preferably a circular outer periphery 68 and an elliptical inner periphery 69 and are described in further detail in U.S. patent application Ser. No. 08/297,730 filed Aug. 29, 1994 by Mooney et al., entitled "Dual Mode Transducer for a Portable Receiver" which is assigned to the Assignee of the present invention and which is incorporated by reference herein.

FIG. 3 is a top elevational view of a compound planar non-linear spring 70 which includes two curved juxtaposed planar compound beams 72 terminated in first and second ends, the first end terminating in a mounting tab 74 for connection to the stepped central region of the magnet support 20 and the second end terminating in a mounting tab 76 for symmetrical connection to opposite planar perimeter regions of the support frame 24. The two curved juxtaposed planar compound beams 72 are formed from two independent concentric arcuate inner beams having a first mean dimension and two independent concentric arcuate outer beams having a second mean dimension, the second mean dimension being larger than the first mean dimension, each having the same or substantially constant, spring rates (K), and are described in further detail in U.S. patent application Ser. No. 08/341,242 filed Nov. 17, 1994 by Holden et al., entitled "Taut Armature Resonant Impulse Transducer" which is assigned to the Assignee of the present invention and which is incorporated by reference herein. It will be appreciated that in order to achieve substantially constant spring rates (K), the inner arcuate beam has a first medial beam width, and the outer arcuate beam has a second medial beam width, wherein the second roedial beam width of the outer arcuate beam is greater than the first medial beam width. It will be appreciated that in order to minimize the size of the tactile alerting device, the planar non-linear spring shown in FIG. 2 is best suited for use in lower spring frequency applications, and that the planar non-linear spring shown in FIG. 3 is best suited for higher frequency applications.

The non-linear springs described in FIGS. 2 and 3 are preferably formed from a sheet metal, such as 0.0040 inch (0.10 mm) thick Sandvik™ 7C27Mo2 Stainless Steel produced by Sandvik Steel Company, Sandviken, Sweden, which is preferably formed using a chemical milling or etching process, although it will be appreciated that other part forming processes can be utilized as well.

Figure 4:
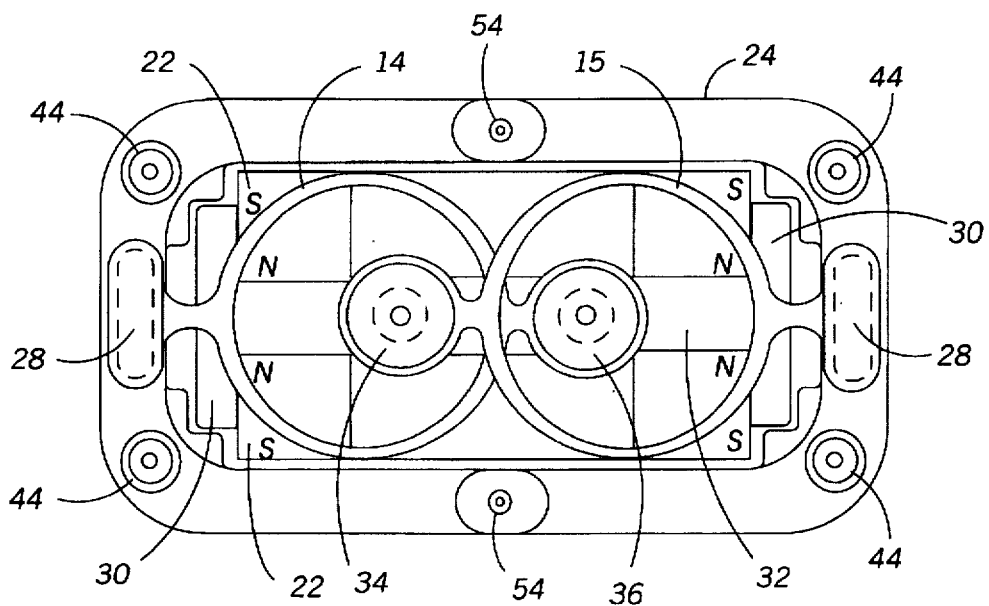
FIG. 4 is a top elevational view of the taut armature resonant impulse transducer of FIG. 1 with housing removed.

Returning to FIG. 1, the magnetic motional mass 18 comprises a magnet support 20 and two permanent magnets 22. The magnet support 20 is preferably manufactured using a die casting process and is preferably cast from a die casting material such as Zamak 3 zinc die-cast alloy. It will be appreciated that the magnetic motional mass can also be manufactured using other casting processes, such as an investment casting process, using casting materials such as tungsten which increase significantly the mass to volume ratio of the magnet support 20, such as is required to achieve significantly lower frequency operation, as will be described below. The magnet support 20, which functions as a magnet mount, is shaped to provide end restraints 30 and top to bottom restraints which are formed by opposing pairs of termination supports 34, 36 which are used to locate the permanent magnets 22 during assembly to the magnet support 20. The magnet support 20 further includes beveled surfaces 32 which provide clearance for the cross coupled, non-linear suspension members for maximizing the excursion of the magnetic motional mass 18 during operation, as will be described further below. The termination supports 34, 36 include flanges which are used to secure the upper, non-linear resonant suspension members 14, 15 and a lower, non-linear resonant suspension members 16, 17 to the magnet support 20 to a stepped central region wherein the termination support 34 is at a first level and termination support 36 is at a second level lower than the first level. Referring to FIG. 4, the permanent magnets 22 are assembled to the magnet support 20 in a predetermined N-S magnetic field orientation, with like poles (north/north or south/south) oriented together. The permanent magnets 22 are assembled to the magnet support 20 using an adhesive bonding material, such as provided by a thermoset beta-stage epoxy preform which is cured using heat and pressure while positioning the permanent magnets 22. The two permanent magnets 22 are preferably formed from a Samarium Cobalt material having a 25 MGOe minimum magnetic flux density, although it will be appreciated that other high flux density magnetic materials can be utilized as well. The permanent magnets 22 are manufactured with beveled surfaces 38 to maximize the excursion of the magnetic motional mass 18 during operation.

The design of the taut armature resonant impulse transducer 100 provides for Z-axis assembly techniques such as utilized in an automated robotic assembly process, or line. The assembly process will be briefly described below. After the permanent magnets 22 have been assembled, as described above, to the magnet support 20, the mounting tabs (64, 74) of the two upper non-linear resonant suspension members 14, 15 are positioned onto the two flanges provided on the termination supports 34, 36 of the magnet support 20, which are then staked, such as by using an orbital riveting process to secure the upper non-linear resonant suspension members 14, 15 to the magnet support 20. The magnetic motional mass 18 is next placed into the cavity shown in FIG. 1 and FIG. 4 within the support frame 24, and is positioned relative to the support frame 24 by the mounting tabs (66, 76) of the upper non-linear resonant suspension members 14, 15. The upper non-linear resonant suspension members 14, 15 are then secured to the support frame 24 by deforming the bosses 28 using a staking process, such as heat or ultrasonic staking. The support frame 24 is then turned over, and the mounting tabs (64, 74) of the lower non-linear resonant suspension members 16, 17 are positioned over the two flanges provided on the termination supports 34, 36, and the mounting tabs (66, 76) of the lower non-linear resonant suspension members 16, 17 are positioned over the bosses 28. The bosses 28 are then deformed as described above, after which the flanges are staked, also as described above, thus completing the assembly of the magnetic motional mass 18 to the support frame 24 and the armature 12.

The taut armature resonant impulse transducer 100 which has been assembled as described above, can be utilized as is, i.e. without a housing, or with a housing to enclose the taut armature resonant impulse transducer 100. The housing, when utilized, preferably comprises an upper housing section 40 and a lower housing section, or base plate 42 shown in FIG. 1. The upper housing section 40 is preferably formed using "316" stainless steel using a suitable forming process such as a sheet metal drawing and forming process. The base plate 42 is also preferably formed using "316" stainless steel using a suitable forming process such as a sheet metal stamping process. It will be appreciated that other non-magnetic materials can be utilized as well to form the upper housing section 40 and the base plate 42.

Figure 5:
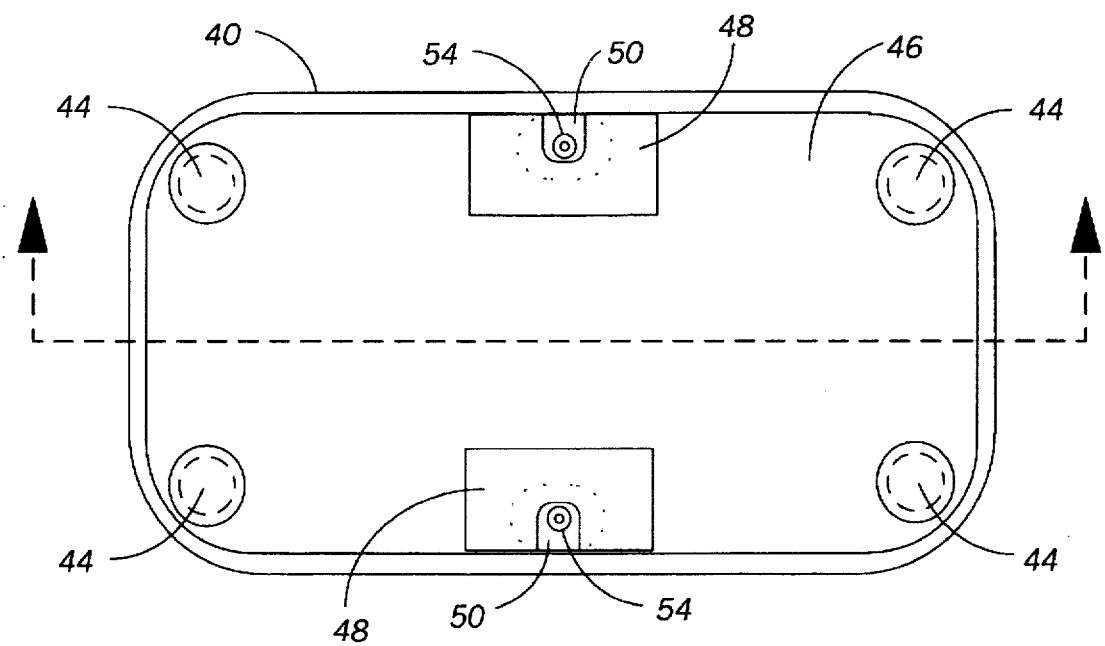
FIG. 5 is a top elevational view of the taut armature resonant impulse transducer of FIG. 1 with housing in place.

When the housing is included, the base plate 42 is positioned over the four lower posts 44, (opposite coil termination 54, which are then deformed using a staking process, such as a heat or ultrasonic staking to secure the base plate 42 to the support frame 24. The upper housing section 40 is next positioned over the opposite four posts 44, after which a printed circuit board 46 is preferably positioned, and the four posts 44 are then deformed using the staking process, as described above, to secure the upper housing section 40 and a circuit board 46 to the support frame 24. The printed circuit board 46, is preferably formed from a suitable printed circuit board material, such as a G10 glass epoxy board, or FR4 glass epoxy board, and is used to provide termination pads 48 for the coil termination 54, as shown in FIG. 5, which is top elevational view of the taut armature resonant impulse transducer 100 with the upper housing section 40 and circuit board 46 in place. Termination pads 48 are provided by copper cladding on the printed circuit board 46 which has been selectively etched to define the pad area. The coil termination 54 are electrically coupled to the termination pads 48 using a soldering technique, or other suitable connecting processes such as a welding process can be utilized as well. Three mounting tabs 52, shown in FIG. 1, are provided on the base plate 42 to mechanically fasten the completely assembled taut armature resonant impulse transducer 100 to a supporting substrate, such as a printed circuit board, as will be described below.

Figure 6:
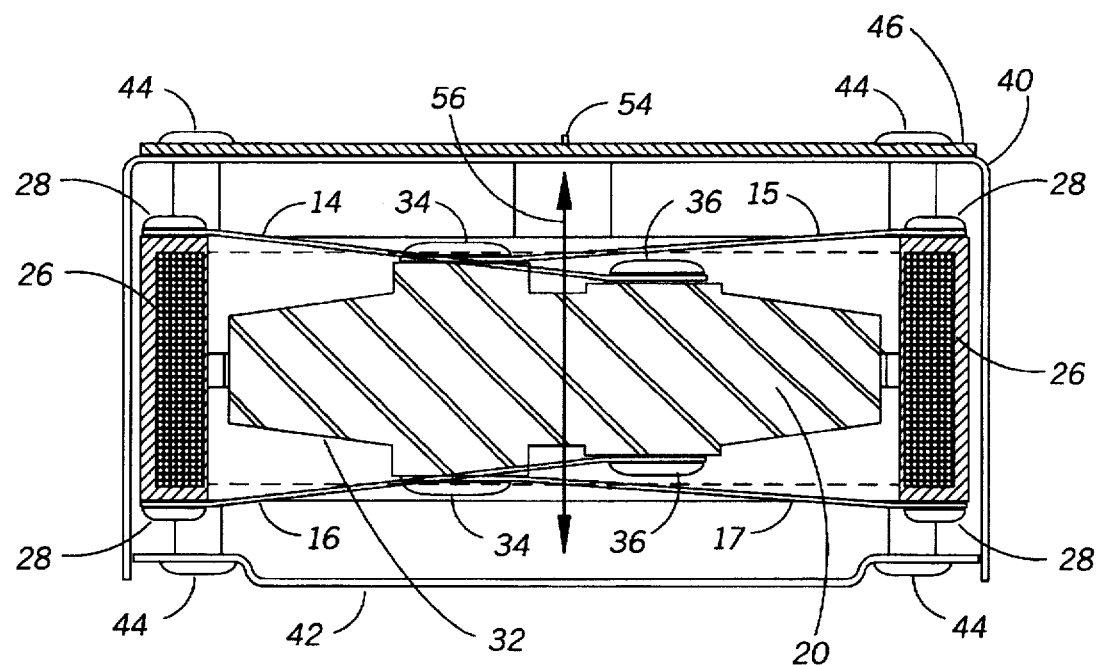
FIG. 6 is a cross section view of the taut armature resonant impulse transducer of FIG. 1.

FIG. 6 is a cross section view of the taut armature resonant impulse transducer 100 of FIG. 1. As shown in FIG. 6, opposing pairs of terminations are located at termination supports 34, 36 which are positioned in the stepped central region of the magnet support 20 and are offset from each other, with termination supports 36 being lower than termination supports 34. The non-linear resonant suspension members 14 and 16 are positioned first between one of the flanges of the termination supports 36 and one of the bosses 28 opposite the median plane of the armature, after which non-linear resonant suspension members 15 and 17 are positioned next between the flanges and one of the termination supports 34, positioned within the planar non-linear spring 60, or the compound planar non-linear spring 70, and one of the bosses 28 opposite the median plane of the armature.

When an input signal in the sub-audible frequency range, or an input signal in the audible frequency range, is coupled to the electromagnetic coil 26, an alternating movement of the magnetic motional mass is generated which is transformed through the upper non-linear resonant suspension members 14, 15 and lower and non-linear resonant suspension members 16, 17 and the electromagnetic driver 24, 26 into tactile energy or acoustic energy, respectively. The upper non-linear resonant suspension members 14, 15 and lower and non-linear resonant suspension members 16, 17 provide a restoring force which is normal to the alternating movement of the magnetic motional mass along axis 56.

Figure 7:
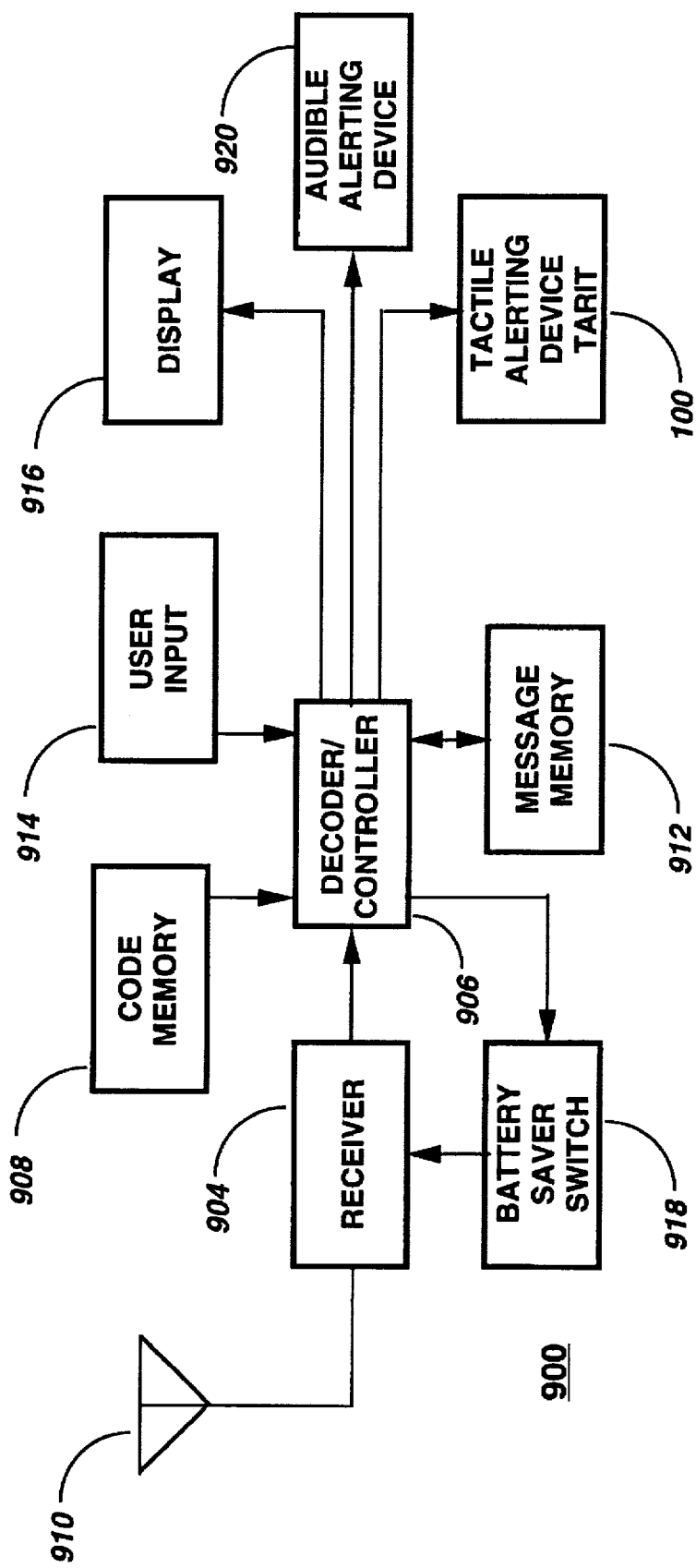
FIG. 7 is an electrical block diagram of a communication device utilizing the taut armature resonant impulse transducer in accordance with the preferred embodiment of the present invention.

FIG. 7 is an electrical block diagram of a portable communication device which utilizes the taut armature resonant impulse transducer 100 in accordance with the preferred embodiment of the present invention. Under the control of the decoder/controller 906, the battery saver switch 918 is periodically energized, supplying power to the receiver 904. When power is supplied to the receiver 904, transmitted coded message signals which are intercepted by an antenna 910 are coupled to the input of the receiver 904 which then receives and processes the intercepted signals in a manner well known to one of ordinary skill in the art. In practice, the intercepted coded message signals include address signals identifying the portable communication device to which message signals are intended. The received address signals are coupled to the input of a decoder/controller 906 which compares the received address signals with a predetermined address which is stored within the code memory 908. When the received address signals match the predetermined address stored, the message signals are received, and the message is stored in a message memory 912. The decoder/controller also generates an alert enable signal which is coupled to an audible alerting device 920, such as a piezoelectric or electromagnetic transducer, to generate an audible alert indicating that a message has been received. Likewise the alert enable signal can be coupled to a tactile alerting device, such as the taut armature resonant impulse transducer 100, to generate tactile energy, as described above, which provides a tactile alert indicating that the message has been received. The audible or tactile alert can be reset by the portable communication device user, and the message can be recalled from the message memory 912 via controls 914 which provide a variety of user input functions. The message recalled from the message memory 912 is directed via the decoder/controller 906 to a display 916, such as an LCD display, where the message is displayed for review by the portable communication device user.

A taut armature resonant impulse transducer 100 has been described above which can efficiently convert either discrete sub-audible frequency (frequencies typically <300 Hz) or swept frequency electrical input signals which are generated at/or near the resonant frequency of the taut armature resonant impulse transducer 100 into high level tactile energy. The taut armature resonant impulse transducer 100 can also efficiently convert audible frequency signals (frequencies typically >300 Hz) into acoustic energy, in a manner similar to that previously described in U.S. patent application No. 08/341,242 filed Nov. 17, 1994 by Holden et al., entitled "Taut Armature Resonant Impulse Transducer". By cross-coupling the upper non-linear resonant suspension members 14, 15 and the lower non-linear resonant suspension members 16, 17, as described above, the length of the housing for the taut armature resonant impulse transducer 100 can be significantly reduced as compared to a transducer which is constructed in which the non-linear resonant suspension members are not cross-coupled. The reduction in the length of the housing results in the overall volume of the taut armature resonant impulse transducer 100 being substantially reduced while providing the same tactile energy output as a taut armature resonant impulse transducer in which the non-linear resonant suspension members are not cross-coupled. The generation of tactile energy is accomplished at a very low current drain as compared to conventional motor driven tactile alerting devices. When the taut armature resonant impulse transducer 100, as described above, is operated at frequencies above the resonant frequency, the taut armature resonant impulse transducer 100 can be described as a taut armature resonant inertial transducer which efficiently converts sound energy into low level tactile energy such as required to deliver audio signals in an inertial audio delivery device, such as a mastoid hearing-aid.

We claim:

1. A taut armature, resonant impulse transducer, comprising:

an electromagnetic driver for effecting an alternating electromagnetic field in response to an input signal;

a magnetic motional mass having a stepped central region which includes a first termination at a first level and a second termination at a second level, said second level being lower than said first level; and an armature, including upper cross-coupled non-linear suspension members and lower cross-coupled non-linear suspension members, said cross-coupled non-linear suspension members comprising first and second non-linear springs, each having a first end and a second end utilized for terminating said first and second non-linear springs, said first end of said first non-linear spring connecting to said first termination of said magnetic motional mass and said first end of said second non-linear spring is positioned within a periphery defining a shape of said first non-linear spring and connecting to said second termination of said magnetic motional mass, and said second end of said first and second non-linear springs connecting to opposite perimeter regions of said electromagnetic driver, said magnetic motional mass is suspended between said upper cross-coupled non-linear suspension members and said lower cross-coupled non-linear suspension members, and coupled to said alternating electromagnetic field for generating an alternating movement of said magnetic motional mass in response thereto, the alternating movement of said magnetic motional mass being transformed through said upper cross-coupled non-linear suspension members and said lower cross-coupled non-linear suspension members and said electromagnetic driver into motional energy.

2. The taut armature, resonant impulse transducer according to claim 1, wherein said first and second non-linear springs comprise two curved planar beams.

3. The taut armature, resonant impulse transducer according to claim 2, wherein said two curved planar beams have a circular outer periphery and an elliptical inner periphery.

4. The taut armature, resonant impulse transducer according to claim 1, wherein said first and second non-linear springs comprise a pair of juxtaposed planar compound beams each comprising at least two independent concentric arcuate beams.

5. The taut armature, resonant impulse transducer according to claim 4, wherein said at least two independent concentric arcuate beams exhibits a substantially identical spring rate (K).

6. The taut armature, resonant impulse transducer according to claim 4, wherein said at least two independent concentric arcuate beams comprise an inner arcuate beam having a first mean dimension, and at least an outer arcuate beam having a second mean dimension, wherein said second mean dimension is greater than said first mean dimension.

7. The taut armature, resonant impulse transducer according to claim 6, wherein said inner arcuate beam and said at least an outer arcuate beam have a circular shape.

8. The taut armature, resonant impulse transducer according to claim 6, wherein said inner arcuate beam has a first medial beam width, and wherein said at least an outer arcuate beam has a second medial beam width, wherein said second medial beam width is greater than said first medial beam width.

9. The taut armature, resonant impulse transducer according to claim 1, wherein said magnetic motional mass comprises:

first and second permanent magnets, each generating a permanent magnetic field having a predetermined N-S magnetic field orientation; and a magnet mount for mounting said first and second permanent magnets such that said predetermined N-S magnetic field orientation of each of said first and second permanent magnets are in opposition.

10. The taut armature, resonant impulse transducer according to claim 1, wherein said input signal is a sub-audible frequency electrical signal, and wherein the alternating movement of said magnetic motional mass is transformed through said upper cross-coupled non-linear suspension members and said lower cross-coupled non-linear suspension members and said electromagnetic driver into tactile energy.

11. An inertial audio delivery device, comprising:

a taut armature, resonant impulse transducer, comprising an electromagnetic driver for effecting an alternating electromagnetic field in response to an audible input signal, a magnetic motional mass having a stepped central region which includes a first termination at a first level and a second termination at a second level, said second level being lower than said first level, and an armature, including upper cross-coupled non-linear suspension members and lower cross-coupled non-linear suspension members, said cross-coupled non-linear suspension members comprising first and second non-linear springs, each having a first end and a second end utilized for terminating said first and second non-linear springs, said first end of said first non-linear spring connecting to said first termination of said magnetic motional mass and said first end of said second non-linear spring is positioned within a periphery defining a shape of said first non-linear spring and connecting to said second termination of said magnetic motional mass, and said second end of said first and second non-linear springs connecting to opposite perimeter regions of said electromagnetic driver, said magnetic motional mass is suspended between said upper cross-coupled non-linear suspension members and said lower cross-coupled non-linear suspension members, and coupled to said alternating electromagnetic field for generating an alternating movement of said magnetic motional mass in response thereto, the alternating movement of said magnetic motional mass being transformed through said upper cross-coupled non-linear suspension members and said lower cross-coupled non-linear suspension members and said electromagnetic driver into motional energy; and p1 a housing, for enclosing said taut armature resonant impulse transducer, for delivering acoustic energy.

12. The inertial audio delivery device according to claim 11, wherein said first and second non-linear springs comprise two curved planar beams.

13. The inertial audio delivery device according to claim 12, wherein said two curved planar beams have a circular outer periphery and an elliptical inner periphery.

14. The inertial audio delivery device according to claim 11, wherein said first and second non-linear springs comprise a pair of juxtaposed planar compound beams each comprising at least two independent concentric arcuate beams.

15. The inertial audio delivery device according to claim 14, wherein said at least two independent concentric arcuate beams exhibits a substantially identical spring rate (K).

16. The inertial audio delivery device according to claim 15, wherein said at least two independent concentric arcuate beams comprise an inner arcuate beam having a first mean dimension, and at least an outer arcuate beam having a second mean dimension, wherein said second mean dimension is greater than said first mean dimension.

17. The inertial audio delivery device according to claim 16, wherein said inner arcuate beam has a first medial beam width, and wherein said at least an outer arcuate beam has a second medial beam width, wherein said second medial beam width is greater than said first medial beam width.

18. The inertial audio delivery device according to claim 11, wherein said magnetic motional mass comprises:

first and second permanent magnets, each generating a permanent magnetic field having a predetermined N-S magnetic field orientation; and a magnet mount for mounting said first and second permanent magnets such that said predetermined N-S magnetic field orientation of each of said first and second permanent magnets are in opposition.

* * * * *

UNITED STATES PATENT AND TRADEMARK OFFICE
CERTIFICATE OF CORRECTION

PATENT NO. : 5,708,726
DATED : January 13, 1998
INVENTOR(S) : Brinkley et al.

It is certified that error appears in the above-indentified patent and that said Letters Patent is hereby corrected as shown below:

Column 9, line 26, delete "p1".

Signed and Sealed this

Ninth Day of June, 1998

Attest:

BRUCE LEHMAN

*Attesting Officer*  *Commissioner of Patents and Trademarks*